Patented Jan. 27, 1953

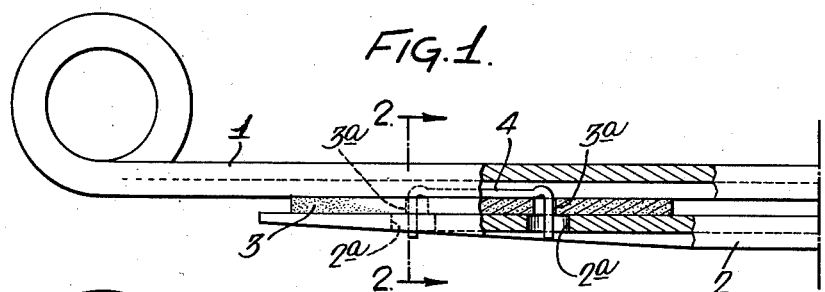
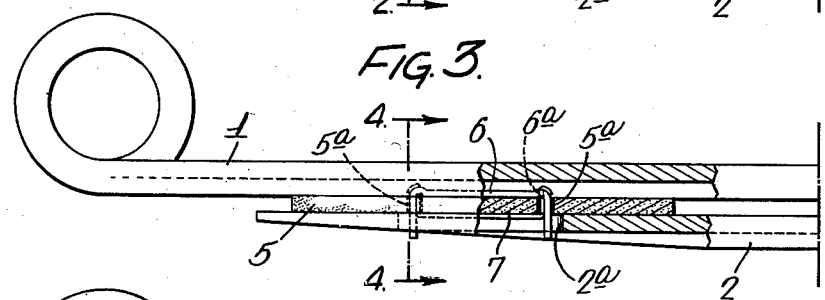
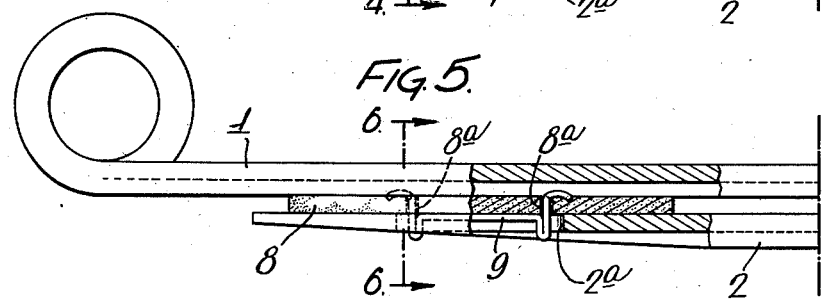
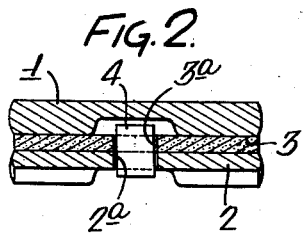
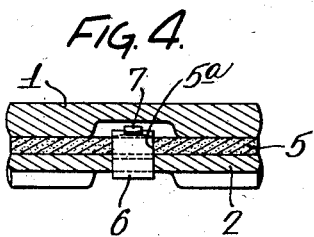
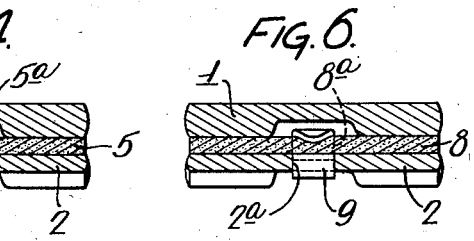

2,626,798

UNITED STATES PATENT OFFICE 2,626,798

LEAF SPRING SPACING STRUCTURE AND ANCHORAGE THEREFOR

John Warren Watson, Wayne, and Richard A. Watson, Villanova, Pa., assignors, by direct and mesne assignments, to John Warren Watson Company, Philadelphia, Pa., a corporation of Pennsylvania Application April 14, 1950, Serial No. 155,912

3 Claims. (Cl. 267—47)

This invention relates to means for anchoring a leaf-end friction bearing structure between two leaves of a leaf spring and particularly for use in connection with spring leaves of center-groove section.

A particular object of our invention is to take advantage of the space provided by the groove in the compression side of the longer of the two leaves to avoid having to inset the anchor means beneath the surface and into the structure of the bearing structure with resultant weakening of the structure such as is necessary when such means are used in connection with leaves of S. A. E. flat section.

A further particular object of our invention is to provide anchoring means for limiting longitudinal, lateral and turning movements of the bearing structure with relation to the leaves and which are of simple design and low cost both as to the manufacture of the anchor means in mass production and their assembly with the bearing structure.

A further particular object of our invention in connection with anchoring means which extend upwardly into the space provided by the center groove in the upper leaf is to make such upwardly extending portion sufficiently narrow to avoid clashing with the side walls of said groove during relative lateral splaying of the two leaves.

Other objects and advantages of the invention will be made apparent from the following description in connection with the accompanying drawings, in which:

Figure 1 is a fragmentary side elevational view, partly in section, showing two adjacent leaves of a leaf spring, a leaf-end friction bearing structure spacing said leaves and anchoring means carried by said bearing structure for retaining said structure in predetermined limited position between said leaves;

Figure 2 is a cross sectional view on line 2—2, Fig. 1;

Figure 3 is a fragmentary side elevational view, partly in section, showing two adjacent leaves of a leaf spring, a leaf-end friction bearing structure spacing said leaves and two-piece anchoring means attached to said bearing structure for retaining said structure in predetermined limited position between said leaves;

Figure 4 is a cross sectional view on line 4—4, Fig. 3;

Figure 5 is a fragmentary side elevational view, partly in section, showing two adjacent leaves of a leaf spring, a leaf-end friction bearing structure spacing said leaves and an anchor member attached to said bearing structure for retaining said structure in predetermined limited position between said leaves;

Figure 6 is a cross sectional view on line 6—6, Fig. 5.

Referring to Figures 1 and 2, numeral 1 designates one of two adjacent leaves of a leaf spring and which leaves are of center-groove section; 2 designates the other of said leaves; 2a designates each of two round holes provided in leaf 2 adjacent an end thereof; 3 designates a leaf-end friction bearing structure; 3a designates each of two through holes provided in bearing structure 3; 4 designates a staple-like anchor member carried by the bearing structure against a portion of the upper surface thereof and penetratively engaging through holes 3a and 2a. One elongated hole, preferably round-ended, may be substituted for the two holes 2a if desired. Manufacturing expediency may be relied upon to dictate the choice.

Referring to Figures 3 and 4, 1 designates one of two adjacent leaves of a leaf spring and which leaves are of center-groove section; 2 designates the other of said leaves; 2a designates an elongated preferably round-ended hole provided in leaf 2 adjacent an end thereof; 5 designates a leaf-end friction bearing structure; 5a designates each of two through holes provided in bearing structure 5; 6 designates a staple-like anchor member carried by the bearing structure against a portion of the upper surface thereof and penetratively engaging holes 5a and hole 2a; 6a designates each of two through holes provided in anchor member 6; 7 designates a second staple-like anchor member carried against a portion of the lower surface of bearing structure 5 penetrating holes 5a and 6a and having its ends securely crimped over the shoulder portions of anchor member 6 for the purpose of holding anchor member 6 in secure relation with bearing structure 5.

Referring to Figures 5 and 6, 1 designates one of two adjacent leaves of a leaf spring and which leaves are of center-groove section; 2 designates the other of said leaves; 2a designates an elongated preferably round-ended hole provided in leaf 2 adjacent an end thereof; 8 designates a leaf-end friction bearing structure; 8a designates each of two through holes provided in bearing structure 8; 9 designates a staple-like anchor member penetratively engaging hole 2a and holes 8a and securely attached to bearing structure 8 by the turning of the ends of the anchor member. This member is in form the same as anchor member 3 shown in Figure 1 in copending application of John Warren Watson, dated April 25, 1947, Serial No. 743,997, except for the fact that the leg portions are here permitted to extend above the surface of the bearing structure and can be turned over in rounded form as provided by general stapling practice. This greater ease of attachment is made possible, in the present instance, by the space provided by the groove in leaf 1 as contrasted to leaf 1 of S. A. E. flat section in the co-pending application above cited. Not only is the rounded arch of the end portions more easily accomplished, but the job done in this manner can be accomplished by existing standard stapling machines. Also the avoidance of crushing the bearing structure is of very great importance. Bearing structures now in general favor are thinner than here shown and hence any embedment and crushing becomes increasingly detrimental to the bearing structure and to the secure hold of the anchor member with relation thereto.

The leaf-end friction bearing structure 3, 5 and 8 are preferably made to present to at least one of the leaves a surface of sufficient yieldability to conform to irregularities thereof and to exhibit frictional properties whereof the static and dynamic coefficients of friction are sufficiently in balance to avoid setting up destructive spasmodic actions and/or objectionable noise-producing vibrations. They may be made of impregnated and hence coated textile fabric, saturating paper similarly impregnated and coated or other suitable material or structure exhibiting frictional properties as above.

As here shown, the anchor members and the holes penetrated by the members are so related as to hold the bearing structure more or less fast with relation to the shorter of the two leaves. Should it be desired to avail one's self of the lost motion or full floating action of the bearing structure with relation to both of the leaves, as set forth in the above-cited co-pending application, holes 3a in bearing structure 3, Fig. 1, may be appreciably elongated, longitudinally of the spring. In Figs. 3 and 5, if the float is desired the elongated holes 2a may be appreciably elongated.

The term "elongated," as here employed, refers to a horizontal and not a vertical direction.

We claim:

1. In combination, two adjacent leaves of a leaf spring the longer of which is of center-groove section, a leaf-end friction bearing structure between said leaves and presenting to at least one of them a surface of sufficient yieldability to conform to irregularities thereof, and anchoring means for limiting longitudinal, lateral and turning movements of said bearing structure with relation to the shorter of said leaves, said anchoring means comprising an anchor member carried against the upper surface of said bearing structure and extending into the space provided by said groove in said longer leaf and penetratively engaging through hole means in said bearing structure and hole means in said shorter leaf adjacent an end thereof, said bearing structure and said anchoring means, upon the spreading of said leaves, being readily removable for replacement purposes.

2. In combination, two adjacent leaves of a leaf spring the longer of which is of center-groove section, a leaf-end friction bearing structure between said leaves and presenting to at least one of them a surface of sufficient yieldability to conform to irregularities thereof, and an anchor member for limiting longitudinal, lateral and turning movements of said bearing structure with relation to the shorter of said leaves, said anchor member being carried against the upper surface of said bearing structure and extending into the space provided by said groove in said longer leaf and penetratively engaging through hole means in said bearing structure and hole means in said shorter leaf.

3. In combination, two adjacent leaves of a leaf spring the longer of which is of center-groove section, a leaf-end friction bearing structure between said leaves and presenting to at least one of them a surface of sufficient yieldability to conform to irregularities thereof, and anchoring means for limiting longitudinal, lateral and turning movements of said bearing structure with relation to the shorter of said leaves, said anchoring means being carried against the upper and lower surfaces of said bearing structure and extending into the space provided by said groove in said upper leaf and penetratively engaging through hole means in said bearing structure and hole means in said shorter leaf adjacent an end thereof.

JOHN WARREN WATSON.
RICHARD A. WATSON.

REFERENCES CITED

The following references are of record in the file of this patent:

UNITED STATES PATENTS

| Number | Name | Date |
|---|---|---|
| 2,028,299 | Swinton | Jan. 21, 1936 |
| 2,270,516 | Dow | Jan. 20, 1942 |